UNITED STATES PATENT OFFICE.

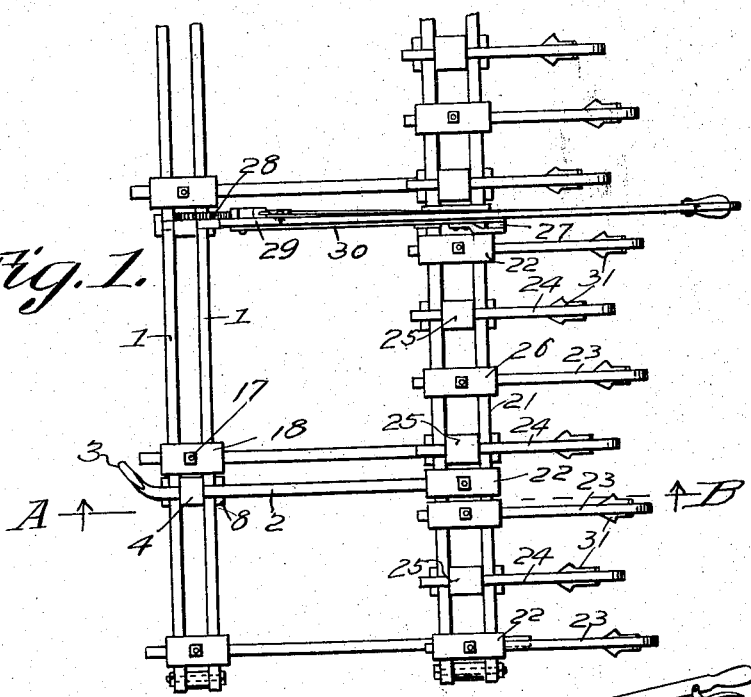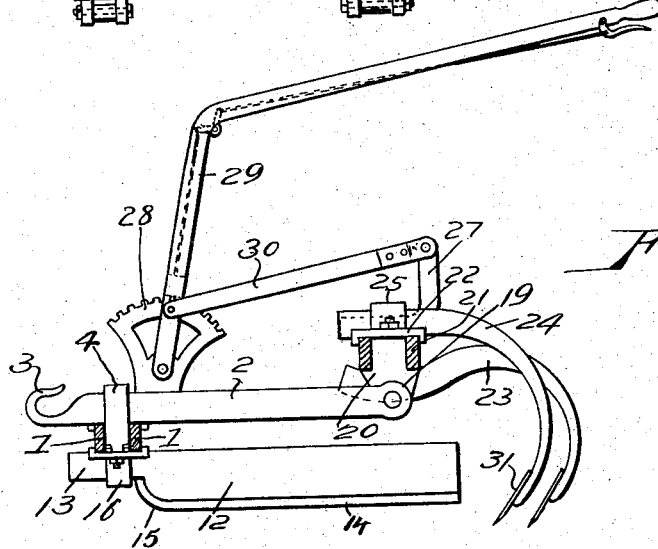

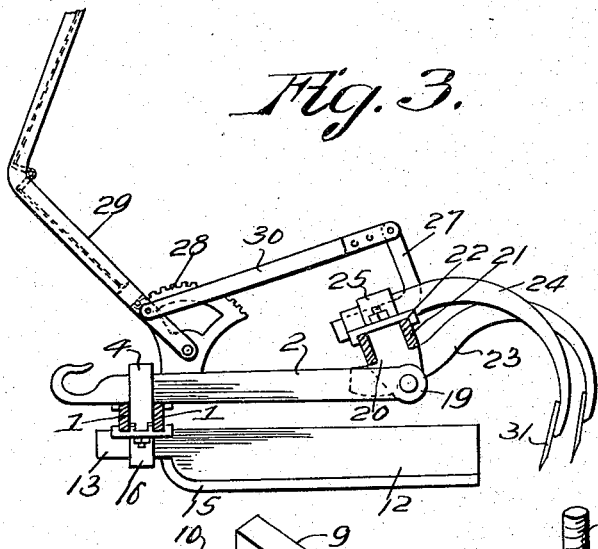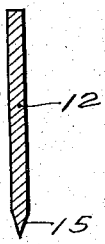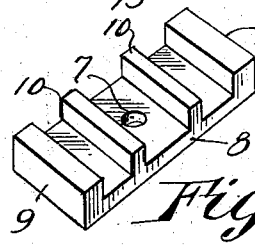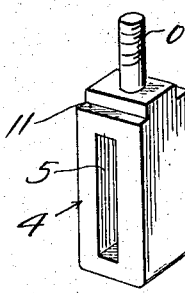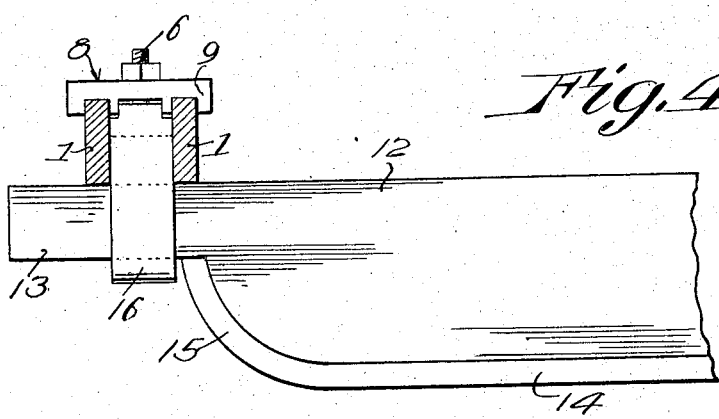

ISHAM S. KIMBRIEL, OF SOMIS, CALIFORNIA.

CULTIVATOR.

1,217,776.  Specification of Letters Patent.  Patented Feb. 27, 1917.

Application filed April 17, 1916. Serial No. 91,673.

*To all whom it may concern:*

Be it known that I, ISHAM S. KIMBRIEL, a citizen of the United States, residing at Somis, in the county of Ventura and State of California, have invented a new and useful Cultivator, of which the following is a specification.

This invention relates to cultivators, one of its objects being to provide means whereby the cultivator will be prevented from shifting laterally while being used on a slope but will, instead, be maintained along a straight line so that there will be no lateral drag upon the draft animals and it will, consequently, be easier to pull when used upon a hillside or slope than would otherwise be the case.

A further object is to provide runners of novel form having means whereby they can be attached readily to a cultivator, these runners being adapted to cut into the soil and thus maintain the cultivator pointed in the proper direction.

With the foregoing and other objects in view which will appear as the description proceeds, the invention resides in the combination and arrangement of parts and in the details of construction hereinafter described and claimed it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a plan view of approximately one-half of a cultivator having the present improvements combined therewith.

Fig. 2 is a section on line A—B Fig. 1.

Fig. 3 is a view similar to Fig. 2 and showing the cultivator teeth lifted out of engagement with the soil.

Fig. 4 is an enlarged side elevation of a portion of one of the runners and showing the means employed for fastening it to the cultivator.

Fig. 5 is a perspective view of one of the fastening plates.

Fig. 6 is a perspective view of one of the holding blocks.

Fig. 7 is a transverse section through one of the runners.

Referring to the figures by characters of reference 1 designates parallel front beams on which is mounted a draw bar 2. The forward portion of the draw bar 2 is preferably hooked as at 3 for engagement with a draft chain or the like. The draw bar is extended through a block 4 having a slot 5 therein and which block is fitted snugly between the beams 1 and has a threaded stem 6. This stem extends through an opening 7 formed in the center of a plate 8 which bears against the bottom faces of the beams 1 and has end flanges 9 lapping the outer faces of the two beams. Transverse ribs 10 are provided on the plate and project between the beams and into grooves or rabbets 11 provided in one end portion of the block 4. Thus it will be seen that by tightening the stem 6 within the plate 8, the block 4 will be pulled downwardly so as to bind the draw bar 2 upon the beams 1 and hold it fixed relative thereto.

At desired intervals along the beams 1 are provided runners such as indicated at 12. Each runner has an angular stem 13 at its front end and has its lower edge sharpened as at 14 and merging into a rounded front cutting edge 15. The stem 13 is extended through a block 4, disposed oppositely to the other blocks 4, the stem of the block 4 being projected upwardly between the beams 1, as shown at 17 and passing through a plate 8 which is similar to the plate 8 heretofore referred to but rests upon the beams 1. Thus by tightening the stems 13 the blocks 4 will be drawn upwardly thereby binding the stems 13 upon the lower edges of the beams 1. Obviously, therefor, the runners will be held fixed relative to the beams 1 and draw bars 2.

Hingedly connected to the draw bar 2 at the rear end thereof is a block 19 having oppositely extending shoulders 20 supporting parallel beams 21. These beams are straddled by a plate 22 which is bolted to the block 19, thus securely fastening the beams to the block. Standards 23 and 24 are extended under and over the beams 21, respectively, and are fastened thereto by blocks 25 and plates 26 similar to the blocks 4 and plates 8 heretofore described.

An arm 27 is fixedly connected to the beams 21 in any manner desired and a toothed segment 28 is fixedly connected to the beams 1 in any desired manner. A lever 29 is fulcrumed upon the segment 28 and is connected by a link 30 to the arm 27. Thus it will be seen that by shifting lever 29 relative to the draw bar 2, the beams 21 and the parts carried thereby can be adjusted angularly relative to the draw bar 2, thus to raise or lower the standards 23 and 24 and shift the cultivator teeth 31 out of or into engagement with the ground.

When the cultivator is in use, the runners 12 will rest upon the ground, the lower edges thereof cutting into the surface of the ground so as to prevent the cultivator from shifting laterally while moving over a hillside. Thus the lateral shifting which ordinarily occurs while a hillside is being cultivated, is prevented and the cultivator can be more easily handled than heretofore and will cause less strain upon the draft animals. Obviously the runners 12 can be readily applied to or taken from the cultivator and while they have been shown connected to a particular form of cultivator it is to be understood that they can be readily applied to cultivators of other types.

What is claimed is:—

1. In a cultivator, runners, stems projecting forwardly therefrom, connected beams fixedly secured upon the stems, a structure fixedly connected to the beams and extending rearwardly therefrom and above the runners, there being a clear unobstructed space between the runners and said structure and back of the beams, a series of teeth connected together to move in unison and supported by said structure, and means for simultaneously shifting the teeth into or out of position back of the runners.

2. In a cultivator, the combination with parallel beams, and a member extending thereacross for attachment thereto, of a block extending between the beams and having a slot through which said member extends, a stem projecting from one end of the block, there being side recesses in the block at said end, a plate removably mounted on the stem, transverse ribs upon the plate at the ends thereof and adapted to lap and engage the outer sides of the beams, transverse ribs upon the plate at intermediate points and adapted to engage the inner sides of the beams and to project into the recesses in the block, and means adjustably engaging the stem for binding the plate upon the beams and for drawing, through the block, upon the member engaged thereby to bind it upon the beams.

In testimony that I claim the foregoing as my own, I have hereto affixed my signature in the presence of two witnesses.

ISHAM S. KIMBRIEL.

Witnesses:
JOHN A. L. SNYDER,
JNO. F. FULKERSON.

Copies of this patent may be obtained for five cents each, by addressing the "Commissioner of Patents, Washington, D. C."